United States Patent [19]
Makwinski et al.

[11] Patent Number: 5,863,016
[45] Date of Patent: Jan. 26, 1999

[54] MODULAR FACEPLATE ASSEMBLY HAVING CONCEALED LATCHING MEANS

[75] Inventors: Mark W. Makwinski, Cromwell; Kent R. McCord, West Hartford; Thomas R. Russo, Bristol; Jeffrey D. Hemingway, Burlington, all of Conn.

[73] Assignee: The Wiremold Company, West Hartford, Conn.

[21] Appl. No.: 808,309

[22] Filed: Feb. 28, 1997

[51] Int. Cl.$^6$ ........................................... G12B 9/00
[52] U.S. Cl. .................. 248/27.1; 248/27.3; 220/3.5; 220/3.6; 174/48; 174/58
[58] Field of Search ................................. 248/27.1, 27.3, 248/906; 220/3.6, 3.5, 3.3, 3.9; 174/48, 58

[56] References Cited

U.S. PATENT DOCUMENTS

| | | | |
|---|---|---|---|
| 3,860,739 | 1/1975 | Kloth et al. | 248/27.1 X |
| 4,576,431 | 3/1986 | Thayer | 248/906 X |
| 4,609,119 | 9/1986 | Richter, Sr. | 248/906 X |
| 4,722,136 | 2/1988 | Justiano et al. | 248/27.3 X |
| 5,598,998 | 2/1997 | Lynn | 248/300 |

*Primary Examiner*—Ramon O. Ramirez
*Assistant Examiner*—Long Dinh Phan
*Attorney, Agent, or Firm*—McCormick, Paulding & Huber

[57] ABSTRACT

A modular faceplate assembly having a faceplate and at least one modular panel received and supported within a frontal opening in the faceplate and releasably secured to the faceplate by concealed latches hingedly connected to the modular panel rearward of the faceplate for flexure between latching and releasing positions relative to keepers carried by the faceplate and resiliently biased to said latching positions. When the latches are in latching positions latch operators carried by the latches form closures for latch operating apertures opening through the frontal surface of the faceplate assembly. Cam surfaces on the latch operators facilitate operation of the latches to release the panel from the faceplate in response to insertion of an operating tool into the latch operating apertures.

18 Claims, 2 Drawing Sheets

MODULAR FACEPLATE ASSEMBLY HAVING CONCEALED LATCHING MEANS

BACKGROUND OF THE INVENTION

This invention relates in general to wire management devices and deals more particularly with an improved modular faceplate assembly for mounting at a termination point in a wiring system to support one or more electrical or electronic devices such as, for example, electrical outlet receptacles and/or telecommunications jacks, to facilitate interface with the wiring system. A faceplate assembly of the type with which the improvement of the present invention is concerned is adapted for mounting on a device box, surface mounted raceway or other structure which comprises a part of a wiring system and generally includes a frame or faceplate for supporting one or more modular inserts or panels which carry discrete electrical or electronic devices. The panel or panels are releasably secured to the faceplate or other supporting structure by substantially concealed latching elements. Each insert or panel member is supported within and provides a substantial closure for at least a part of a frontal opening in the faceplate and cooperates with the faceplate to conceal the latching element or elements which retain it in assembly with the faceplate. The panel member or members may also conceal other fasteners which retain the faceplate on an associated supporting structure. A faceplate assembly of the aforedescribed type is particularly suitable for use in a premises distribution/communication system to provide a universal quick change interface for voice, data and video applications.

Some means must, of course, be provided to release each panel or insert from its associated faceplate to enable access to electrical terminations therebehind. Heretofore, discrete latch operating apertures have been provided in the frontal surfaces of such faceplate assemblies and in the regions of the retaining latch or latches to enable a tool such as a screwdriver, for example, to be inserted into and through each latch operating aperture to operate an associated latch whereby the insert or insert members which comprise the assembly may be removed from the faceplate. In such prior art faceplate assemblies each latch is often located some distance rearward of an associated insert panel so that the manner in which the panels are secured to the faceplate is not immediately evident. One who is not familiar with the latching system may accidentally scratch, mar or otherwise damage the frontal surface of the faceplate assembly in an attempt to pry or otherwise remove a panel from the faceplate. Further, the latch operating openings in the frontal surfaces of such prior art faceplate assemblies are usually readily visible and tend to detract from the otherwise smooth uninterrupted surface appearance of the assemblies. The present invention is concerned with these problems.

Accordingly, it is the general aim of the present invention to provide an improved modular faceplate assembly of the concealed latch type having latching means which is easy to operate and which provides improved latch concealment for better overall appearance.

SUMMARY OF THE INVENTION

In accordance with the present invention, a modular faceplate assembly includes a faceplate having a frontal opening, at least one modular insert received and supported within the frontal opening, and latching means including a substantially concealed latch movable between latching and releasing positions relative to the faceplate assembly for releasably retaining the modular insert in assembly with the faceplate within the frontal opening. The faceplate assembly has a latch operating aperture opening through its frontal surface for operating access to the latch. A latch operator carried by the latch and immediately accessible at the latch operating aperture forms a substantial closure for the latch operating aperture when the latch is in its latching position.

DETAILED DESCRIPTION OF PREFERRED EMBODIMENT

Figure 1:
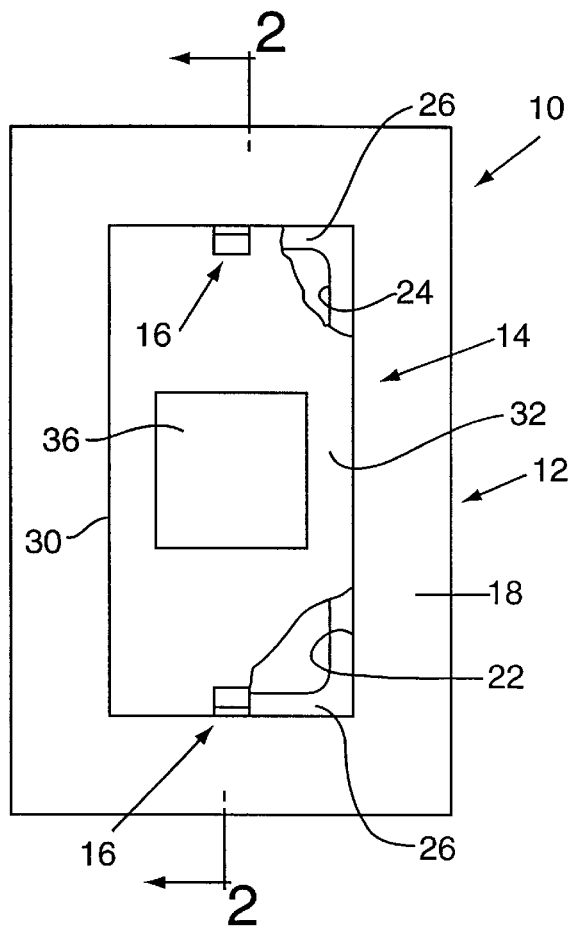
FIG. 1 is a front elevational view of a faceplate assembly embodying the present invention, shown with parts of the assembly broken away to reveal structure therebehind.
Figure 2:
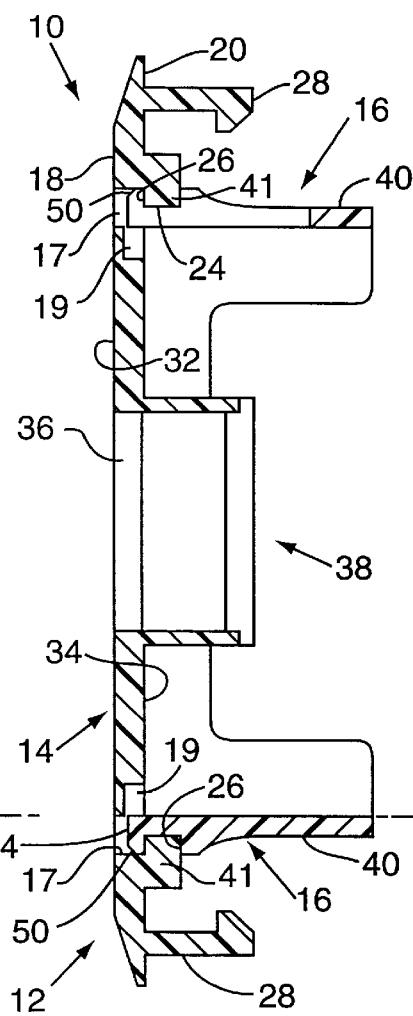
FIG. 2 is a somewhat enlarged sectional view taken generally along the line 2—2 of FIG. 1.

In the drawings and in the description which follows, the present invention is illustrated and described with reference to a faceplate assembly for use in a wire management system. The faceplate assembly, indicated generally at 10 in FIGS. 1 and 2, is particularly adapted for releasable attachment to a wall mounted device box or surface mounted raceway (not shown) to support an electronic device, as for example, a telecommunication jack (not shown) and essentially comprises a frame or faceplate member, indicated generally at 12, a modular insert or panel member, designated generally by the reference numeral 14, and concealed latches, indicated generally at 16,16, for releasably retaining the panel member 14 in assembly with the faceplate member 12. Latch operating apertures, indicated at 17, 17, open through the frontal surface of the faceplate assembly 10 to provide operating access to the concealed latches 16, 16, as will be hereinafter further discussed.

The faceplate member may be made from any suitable material and may take various forms, but in accordance with presently preferred construction it is molded from a durable resilient non-metalic plastic material. The illustrated faceplate member 12 is generally rectangular and has a forwardly facing frontal surface 18 and a rearwardly facing mounting surface 20. A generally rectangular frontal opening 22 formed in the faceplate member 12 extends through the faceplate member and opens through the frontal surface 18 for receiving the panel member 14 therein. A rearwardly offset and inwardly directed flange 24 integrally formed on the faceplate member extends around the frontal opening 22 and projects inwardly beyond the periphery of the frontal opening and toward the center of the latter opening defining a forwardly facing seating surface 26 for supporting the panel member 14 within the frontal opening.

The illustrated faceplate member 12 also includes a pair of integral catches 28, 28, shown in FIG. 2, and resiliently biased to holding positions, for releasably fastening the faceplate member to an associated supporting structure, such as a mounting frame on a device box or raceway, (not shown). However, it should be understood that other fastening arrangements may be provided for this purpose.

In accordance with presently preferred construction, the insert or panel member 14 is made from the same durable resilient non-metalic plastic material from which the faceplate member 12 is made The faceplate and panel members 12 and 14 are preferably identical in color, for a reason that will be hereinafter evident. The illustrated panel member 14 includes a generally rectangular panel 30 sized to be received within and substantially compliment the faceplate frontal opening 22. The panel 30 has front and rear surfaces respectively indicated at 32 and 34. The panel front surface 32 is generally contiguous to or coextensive with the faceplate frontal surface 18 when the panel 30 is disposed within the frontal opening 22 and in seating engagement with the seating surface 26.

Notches formed in the panel 30 open outwardly through the upper and lower peripheral edges of the panel and cooperate with the peripheral surface of the frontal opening 22 to define the latch operating apertures 17, 17. Rearwardly open upper and lower recesses 19, 19 are formed in the panel 30. Each recess 19 communicates with or opens into an associated latch operating aperture 17, substantially as shown and for a purpose which will be hereinafter apparent.

A generally rectangular fixture receiving opening 36 extends through the panel 30 and communicates with a fixture retaining structure, indicated generally at 38, integrally connected to and projecting rearwardly from the panel rear surface 34. As previously noted, the illustrated faceplate assembly 10 is particularly adapted to receive and support an electronic fixture, such as telecommunication jack (not shown), which is disposed within the fixture receiving opening 36, supported by the fixture retaining structure 38 and releasably retained in assembly with the panel member 14 in a manner well known in the art. Upper and lower end walls, respectively indicated at 40, 40, project rearwardly from the panel 30. The latter end walls are connected to and at least partially supported by the fixture retaining structure 38 and impart rigidity to the panel structure.

The latches 16, 16 for releasably retaining the panel member 14 in assembly with the frame or faceplate member 12 are substantially identical. Each latch member 16 is supported on the panel member 14 in rearwardly spaced relation to the panel 30 to cooperate with an associated keeper indicated at 41. In accordance with presently preferred construction, each keeper 41 is defined by an associated portion of the flange 24 carried by the faceplate 12.

Figure 3:
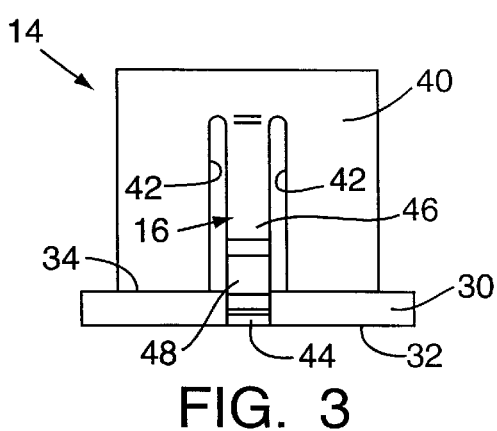
FIG. 3 is a somewhat enlarged top plan view of the insert module or panel member shown in FIG. 1.
Figure 4:
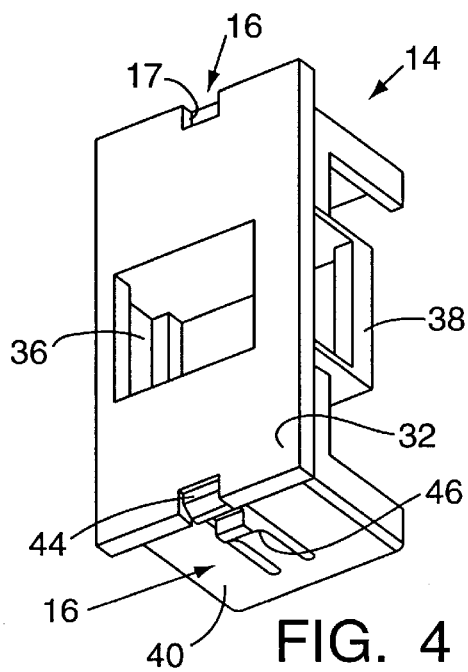
FIG. 4 is a somewhat reduced perspective view of the insert module shown in FIG. 1.
Figure 5:
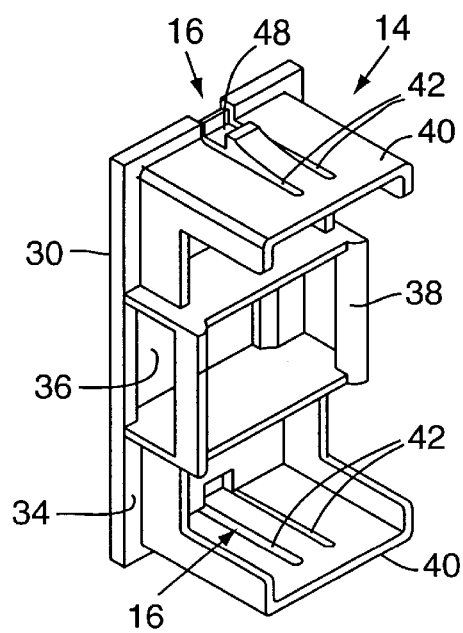
FIG. 5 is another somewhat reduced perspective view of the insert module shown in FIG. 1.
Figure 7:
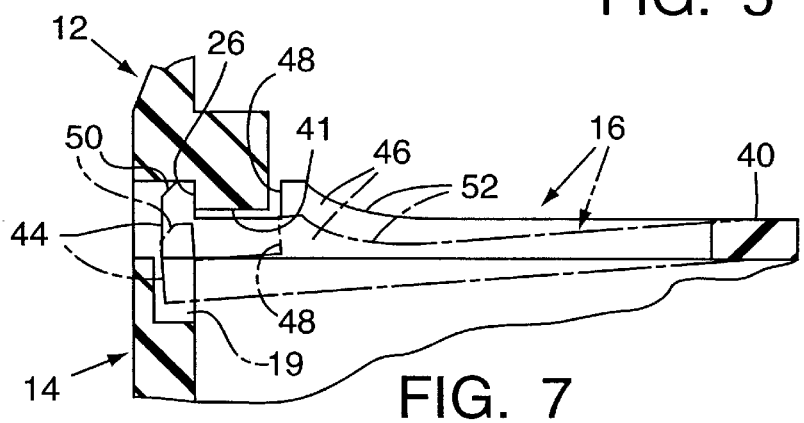
FIG. 7 is a somewhat enlarged fragmentary sectional view of the faceplate assembly shown in FIG. 2.
Figure 6:
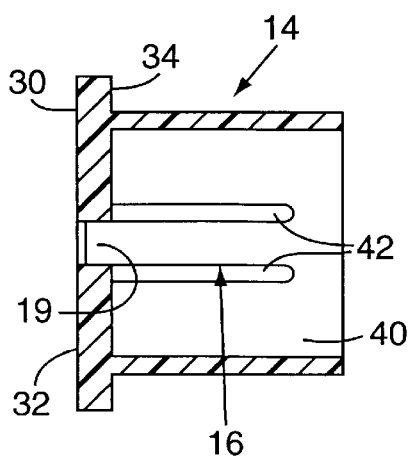
FIG. 6 is a fragmentary sectional view of the insert module taken along the line 6—6 of FIG. 2

The upper latch 16, as it appears oriented in the drawings, is integrally connected to and partially defined by the upper wall 40. A pair of parallel slots 42, 42 formed in the upper wall 40 extend rearwardly from the panel 30 to separate the upper latch 16 from the upper wall 40, as best shown in FIG. 3. Thus, the upper latch 16 is integrally connected to the upper wall 40 in rearwardly spaced relation to the panel 30 for resilient hinged flexure relative to the panel. An integral latch operator 44 at the forward end of the upper latch 16 cooperates with a cam member 46 integrally formed on the latch 16 and spaced rearwardly of the latch operator 44 to define a latching recess 48 for receiving the upper keeper 19, as best shown in FIG. 7. The latch 16 is supported on the upper wall 40 for resilient hinged flexure between latching and releasing positions, respectively indicated by full and broken lines in FIG. 7. In its latching position, the upper latch 16 is engaged with the upper keeper 41 defined by the flange 24 on the faceplate member. In its releasing or broken line position of FIG. 7 the keeper 41 is disposed outside of the latching recess 48 and the latch operator is at least partially disposed within the rearwardly open recess 19.

The latch operator has a latch releasing cam 50 for moving the latch 16 from its latching position to its releasing position in response to insertion of a latch releasing tool into the latch operating aperture 17. Specifically, the latch operator 44 has a forwardly facing latch releasing cam surface 50 thereon. The cam surface 50 is inclined rearwardly and outwardly away from the panel in a direction opposite the direction of latch movement from latching toward releasing position. Thus, insertion of a latch releasing tool, such as a small screwdriver, into the latch operating aperture 17 causes the latch 16 to move toward its releasing position upon engagement with the inclined cam surface 50. When the releasing tool attains a position between the free end of the latch operator and the faceplate the tool may be employed to move the latch to a releasing position to free an associated portion of the panel 30 from the faceplate.

When the upper latch 16 is in a releasing position it is at least partially disposed within the rearwardly open recess 19 in the panel 30. The latter recess is provided so that the upper latch operator may be located close to the panel surface 32. When the upper latch 16 is in its latching position the latch operator provides a substantial closure for the latch upper latch operating aperture 17. Since the latch is made form the same material as the panel the latch operator 44 in its latching position will not be readily visible to the casual viewer. The frontal surface of the panel 30 and the frontal surface of the faceplate 14 surrounding the panel will generally appear as a smooth uninterrupted surface.

Since the cam surface 50 on the latch operator is located within a relatively shallow latch operating aperture 17 the cam surface is immediately accessible for engagement by a tool for operation in response to insertion of the tool into the latch operating aperture 17. The latch operators 44, 44 in latching position are scarcely visible within the shallow apertures 17,17 and against the background of the same color provided by the frontal surfaces of the panel 30 and the faceplate 12.

Figure 8:
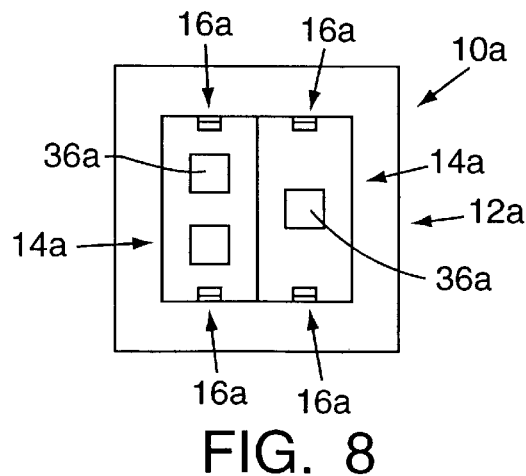
FIG. 8 is a somewhat reduced front elevational view similar to FIG. 1, but illustrating another embodiment of the invention.

Another faceplate assembly embodying the present invention is shown in FIG. 8 and indicated generally by the reference numeral 10a. The illustrated faceplate assembly 10a is substantially identical in most respects to the previously described panel assembly 10. However, the panel assembly 10a includes a faceplate 12a which is larger than the faceplate 12 and defines a generally rectangular frontal opening 22a which is substantially larger than the opening 22. The opening 22a is adapted to receive and contain a plurality of releasably retained modular insert panels 14a, 14a (two shown).

We claim:

1. In a faceplate assembly including a faceplate member having a frontal opening, at least one modular insert member received and supported within the frontal opening, and latching means for releasably retaining the at least one modular insert member in assembly with the faceplate member within the frontal opening, the latching means including a concealed latch carried by the at least one insert member and a keeper carried by the faceplate member, the latch being movable between latching and releasing positions relative to the keeper, the modular insert having a forwardly open latch operating aperture for operating access to the latch, the improvement comprising a latch operator carried by said latch, said latch operator cooperating with said modular insert within said latch operating aperture to form a closure for said latch operating aperture, said latch operator being disposed within and entirely closing said latch operating aperture when said latch is in its latching position.

2. In the faceplate assembly as set forth in claim 1 the further improvement wherein said faceplate assembly defines a rearwardly open recess communicating with said latch operating aperture and said latch operator is at least partially disposed within said recess in said releasing position.

3. In the faceplate assembly as set forth in claim 2 wherein the latch operating aperture is defined by a notch in a peripheral edge of said at least one modular insert member the further improvement wherein said recess is defined by said at least one modular insert member.

4. In the faceplate assembly as set forth in claim 1 the further improvement including camming means for moving said latch from said latching position to said releasing position in response to insertion of a latch releasing tool into said latch operating aperture.

5. In the faceplate assembly as set forth in claim 4 the further improvement wherein said camming means comprises a cam surface on said latch operator.

6. In the faceplate assembly as set forth in claim 5 the further improvement wherein said cam surface is defined by a generally forwardly facing surface on said latch operator inclined rearwardly and in a direction opposite the direction of movement of said latch from said latching position to said releasing position.

7. In the faceplate assembly as set forth in claim 1 wherein the faceplate assembly includes mounting means for supporting said at least one modular insert member within said frontal opening the further improvement wherein said mounting means comprises said latching means.

8. In the faceplate assembly as set forth in claim 7 the further improvement wherein said latch operator is disposed forward of said mounting means when said latch is in said latching position.

9. In the faceplate assembly as set forth in claim 8 wherein said mounting means includes a flange on the faceplate member extending into the frontal opening and said latch is carried by said at least one modular insert member the further improvement wherein said at least one modular insert member has a recess therein communicating with said latch operating aperture and said latch operator is at least partially disposed within said recess when said latch operator is in said releasing position.

10. In the faceplate assembly as set forth in claim 8 the further improvement wherein said latch is supported on said at least one modular insert member for hinged flexure relative to said one modular insert member between said latching and releasing positions.

11. In a faceplate assembly including a faceplate having a frontal opening, a modular insert received and supported within the frontal opening, and latching means including a keeper on the faceplate an a latch supported on the modular insert for hinged flexure between latching and releasing positions relative to the keeper for releasably retaining the modular insert in assembly with the faceplate within the frontal opening, the latch being resiliently biased toward and to its latching position, the faceplate assembly having a forwardly open latch operating aperture partially defined by a notch in the modular insert for operating access to the latch member, the improvement comprising a latch operator carried by said latch, said latch operator forming a closure for said latch operating aperture, said latch operator maintaining said latch operating aperture in a substantially entirely closed condition when said latch is in its latching position.

12. In the faceplate assembly as set forth in claim 11 the further improvement wherein said modular insert defines a rearwardly open recess communicating with said latch operating aperture and said latch operator is at least partially disposed within said recess in said releasing position.

13. In the faceplate assembly as set forth in claim 12 the further improvement wherein said notch opens outwardly through a peripheral edge of said modular insert.

14. In the faceplate assembly as set forth in claim 11 the further improvement including camming means for moving said latch from said latching position to said releasing position in response to insertion of a latch releasing tool into said latch operating aperture.

15. In the faceplate assembly as set forth in claim 14 the further improvement wherein said camming means comprises a cam surface on said latch operator.

16. In the faceplate assembly as set forth in claim 15 the further improvement wherein said cam surface is defined by a generally forwardly facing surface on said latch operator inclined rearwardly and in a direction opposite the direction of movement of said latch member from said latching position to said releasing position.

17. In the faceplate assembly as set forth in claim 11 the further improvement wherein said faceplate and said modular insert are made from resilient non-metallic plastic material.

18. In the faceplate assembly as set forth in claim 17 the further improvement wherein the said faceplate and said modular insert member are of identical color.

* * * * *

UNITED STATES PATENT AND TRADEMARK OFFICE
CERTIFICATE OF CORRECTION

PATENT NO. : 5,863,016
DATED : January 26, 1999
INVENTOR(S) : Mark W. Makwinski, Kent R. McCord
Thomas R. Russo and Jeffrey D. Hemingway It is certified that error appears in the above-indentified patent and that said Letters Patent is hereby corrected as shown below:

Column 3

Line 8, after "made" insert --.--.

Line 62, delete "19" and substitute --41--.

Column 4

Line 26, delete "form" and substitute --from--.

In the Claims

Claim 11

Line 4, delete "an" and substitute --and--.

Signed and Sealed this

Seventeenth Day of August, 1999

Attest:

Q. TODD DICKINSON

Attesting Officer

Acting Commissioner of Patents and Trademarks